United States Patent [19]

Miyazawa et al.

[11] Patent Number: 5,232,718
[45] Date of Patent: Aug. 3, 1993

[54] INJECTION MOLDING SYSTEM FOR MAKING PREFORM WITH UNDERCUT

[75] Inventors: Yoshiki Miyazawa, Ueda; Hidehiko Fukai; Heijiro Sakurai, both of Nagano, all of Japan

[73] Assignee: Nissei ASB Machine Co., Ltd., Nagano, Japan

[21] Appl. No.: 763,605

[22] Filed: Sep. 23, 1991

[30] Foreign Application Priority Data

Sep. 29, 1990 [JP] Japan .................. 2-261298

[51] Int. Cl.$^5$ ............................................. B29C 45/44
[52] U.S. Cl. .................... 425/577; 425/533; 425/589; 425/595; 425/DIG. 58
[58] Field of Search .......... 425/533, 589, 577, 595, 425/522, DIG. 58

[56] References Cited

U.S. PATENT DOCUMENTS

| | | | |
|---|---|---|---|
| 3,855,380 | 12/1974 | Gordon et al. | 425/533 X |
| 3,905,740 | 9/1975 | Lovejoy | 425/577 X |
| 4,570,897 | 2/1986 | Von Holdt | 425/DIG. 58 |
| 4,627,810 | 12/1986 | Von Holdt | 425/577 |
| 4,648,834 | 3/1987 | Von Holdt | 425/DIG. 58 |

FOREIGN PATENT DOCUMENTS

| | | |
|---|---|---|
| 0351030 | 1/1990 | European Pat. Off. |
| 1729178 | 6/1971 | Fed. Rep. of Germany |
| 2855144 | 6/1980 | Fed. Rep. of Germany |
| 2409843 | 6/1979 | France |
| 1058175 | 2/1967 | United Kingdom |

Primary Examiner—Richard L. Chiesa
Attorney, Agent, or Firm—Oliff & Berridge

[57] ABSTRACT

An injection molding system is used to mold a preform having an undercut. The molding system includes an injection core mold, and three injection cavity molds, which are a neck mold for defining a neck of the preform, a first cavity mold including two mold halves for defining an outer wall of the preform having the undercut, and a second cavity mold for defining a remaining outer wall of the preform. The molding system also includes a clamping unit for opening and clamping the foregoing molds and a mold half opening mechanism for opening and clamping mold halves of the first cavity mold.

17 Claims, 10 Drawing Sheets

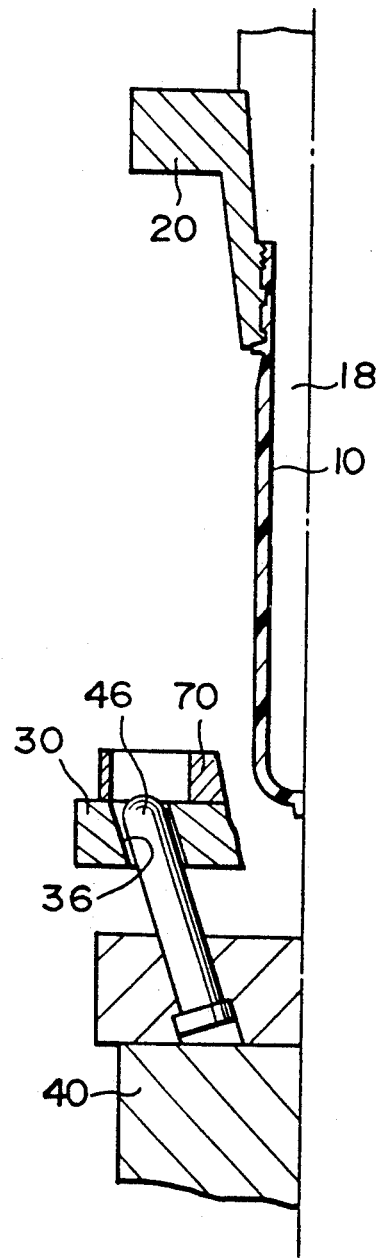
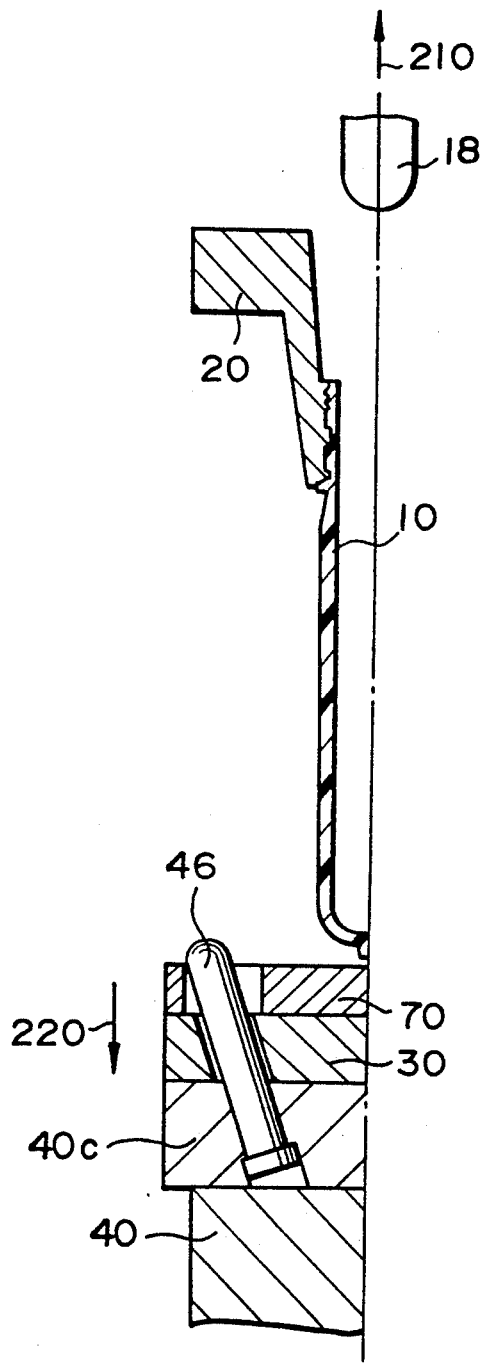

INJECTION MOLDING SYSTEM FOR MAKING PREFORM WITH UNDERCUT

BACKGROUND OF THE INVENTION

1. Field of the Invention

This invention relates to an injection molding system for making a hollow object, and more particularly to an injection molding system for making a preform having an undercut.

2. Description of the Related Art

With a conventional injection molding system which performs injection molding of a preform, and performs stretching and blowing of a hollow object in one process, a preform injection-molding system comprises a neck mold for defining an outer wall of a neck, a cavity mold for defining an outer wall of the other part of the preform and a core mold for defining an inner wall of the preform. The core mold is positioned in the neck and cavity molds so that the preform can be made by introducing a plastic molding compound into the space between these molds. The molds are opened and clamped by forward and backward movement of one mold clamping unit. Specifically, the core and cavity molds are vertically moved for this purpose. Such injection molding systems are disclosed in a number of publications.

The preform sometimes has an undercut which is reversely tapered at a lower portion of the neck of the preform. In such a case, the molds cannot be opened only by moving the cavity mold downwardly. Therefore, the cavity mold includes two mold halves, which have to be horizontally opened and clamped.

Two mold clamping units should be used to move the molds vertically and to move the two mold halves horizontally. Since the mold clamping unit is required to exert a relatively large clamping force, addition of another mold clamping unit inevitably enlarges and complicates the injection molding system. Two independent energy sources also have to be installed to operate the two mold clamping units.

SUMMARY OF THE INVENTION

It is therefore an object of this invention to provide a preform injection molding system in which one mold clamping unit can open and close molds by a mold clamping force, and open and clamp mold halves of a cavity mold by utilizing a mold opening force which is reverse to the mold clamping force, thereby offer a simplified and compact injection molding system.

According to this invention, there is provided a preform injection molding system comprising: an injection core mold for defining an inner wall of the preform and to be moved axially of and relatively to the preform; an injection cavity mold for defining an outer wall of the preform and to be moved axially along the preform, the injection cavity mold including a first cavity mold having mold halves to be opened and clamped in the direction perpendicular to the axial direction of the preform, the cavities of the mold halves defining an outer wall of the preform having the undercut, and a second cavity mold having a cavity for defining another outer wall of the preform and to be opened axially of and relatively to the preform; a mold clamping unit for opening and clamping the injection core mold and the injection cavity mold by using a mold clamping force along the axial direction of the preform and an opening force reverse to the clamping force, and a mold half opening mechanism for receiving the mold opening force to guide the mold halves to a position where the first cavity mold is released from a largest diameter portion of the undercut of the preform when the second cavity mold is relatively opened in the axial direction of the preform at the initial stage of the mold opening process, and then to guide both the first and second cavity molds in the axial direction of the preform to open the first and second cavity molds.

After it is injection-molded, the preform is released from the molds by opening the first and second cavity molds relatively to the preform. For this purpose, the second cavity mold is downwardly moved by the mold clamping unit which generates a mold opening force in the axial direction of the preform.

When a neck mold is used to make the neck of the preform, the neck mold can be upwardly moved while the second cavity mold is kept stationary. In the initial stage of mold opening, the first and second cavity molds are released in the axial direction of the preform. On receiving a mold opening force, the mold half opening mechanism guides and opens the two mold halves of the first cavity mold perpendicularly to the axial direction of the preform. These mold halves are opened until the cavity side of the first cavity mold comes to a position at least outside the largest diameter portion of the undercut. After the mold halves of the first cavity mold have been opened, both the first and second cavity molds are downwardly moved relatively to the preform so that the preform can be released from the molds.

The molds are clamped by a mold clamping force which is axially reverse to the mold opening force. Only an axial mold clamping pressure is sufficient to clamp the molds to perform the injection molding. The first and second cavity molds preferably have the first and second annular tapers which are contacted to increase the pressure for clamping the mold halves.

After the second cavity mold has been opened relatively to the preform, the first cavity mold is moved axially of the preform to come into contact with the second cavity mold, thereby shortening a stroke for opening the second cavity mold.

The mold half opening mechanism can be realized by an inclined guide hole of the first cavity mold, and an inclined guide shaft of the second cavity mold. The inclined guide shaft is inserted in the inclined guide hole. When engaged, a cam having an inclined surface and a cam follower can serve as the mold half opening mechanism. In such case, the angle of inclination $\Theta_2$ of the inclined guide hole and the inclined surface is made smaller than the angle of inclination $\Theta_1$ so that the first and second tapers can be contacted with less frictional resistance. It is preferable to use either a spring or a cylinder as a drive source to control the movement of the first cavity mold in the axial direction at the initial stage of the mold opening process. The cylinder as the drive source can be also used to contact the first cavity mold with the second cavity mold when the first cavity mold is axially returned after the second cavity mold has been opened.

BRIEF DESCRIPTION OF THE DRAWINGS

FIGS. 6(A) to 6(D) show an operation sequence of opening the molds of the second embodiment;

DETAILED DESCRIPTION OF THE PREFERRED EMBODIMENTS

Preferred embodiment of this invention will now be described referring to the accompanying drawings.

First Embodiment

Figure 1:
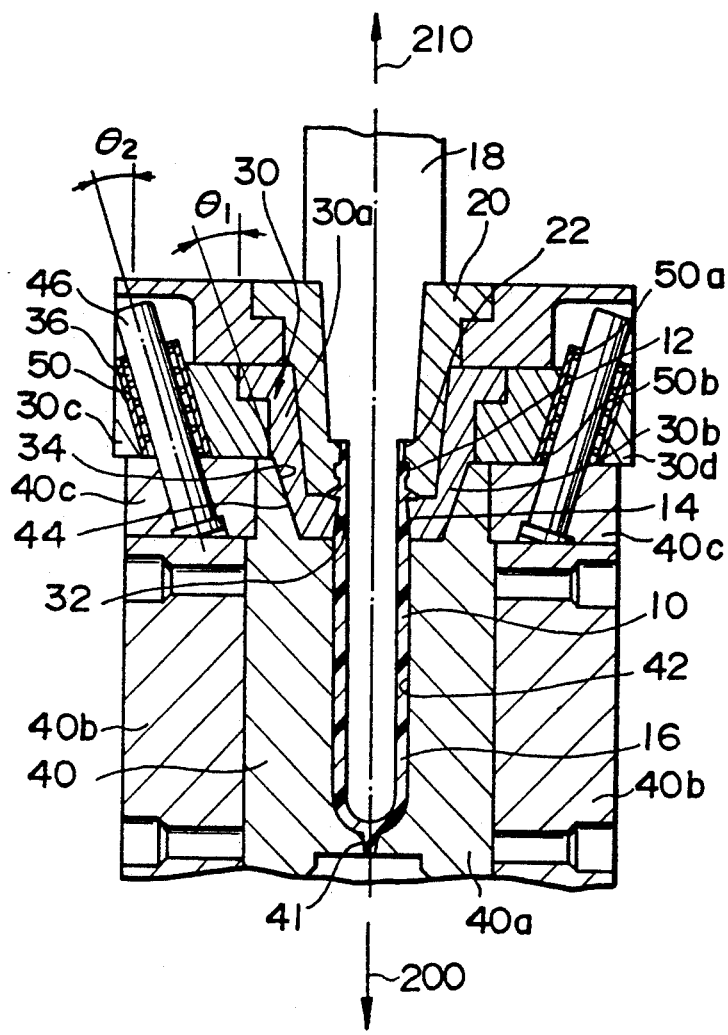
FIG. 1 is a cross-sectional view of an injection molding system according to a first embodiment of this invention.
Figure 2:
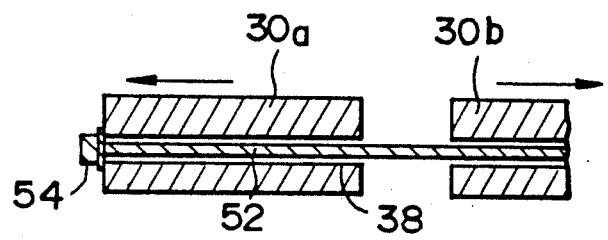
FIG. 2 is a schematic cross-sectional view showing a mechanism for controlling a horizontal stroke of a first cavity mold of the molding system of FIG. 1.

FIG. 1 shows an injection molding system comprising a core mold 18 for defining an inner wall of a preform 10, and three cavity molds for defining an outer wall of the preform 10. They are a neck mold 20, a first cavity mold 30 and a second cavity mold 40.

The neck mold 20 includes a cavity side 22 for shaping a neck 12 of the preform 10. After injection molding, the preform 10 is forwarded to a succeeding process, i.e. a temperature control process, by gripping the neck 12. After the preform undergoes a biaxial stretch blow molding process, a molded hollow object such as a bottle is ejected from the neck mold 20 in an ejecting process. The neck mold 20 has two mold halves (not shown) which are opened and closed horizontally.

The first cavity mold 30 has a cavity side 32 to form a shoulder 14 under the neck 12 of the preform 10. Since the shoulder 14 is an undercut in the shape of a reverse taper, the first cavity mold 30 is made of two mold halves 30a, 30b which can be opened and closed to left and right in the plane of FIG. 1. These mold halves 30a, 30b are fastened to holders 30c, 30d having inclined guide holes 36 to be described later.

The second cavity mold 40 includes a first member 40a having a cavity side 42, a second member 40b for forming a cooling area around the first member 40a, and a third member 40c for fixing an inclined guide shaft 46 (to be described later). The cavity side 42 forms a bottomed side wall 16 under the shoulder 14. The members 40a to 40c are respectively made of two mold halves each to facilitate assembling, functioning together as the second cavity mold 40.

The respective molds will be opened as described below. The height of the neck mold 20 remains the same even when the molds are opened. The core mold 18 is upwardly moved from the interior of the preform by a vertical upward opening force 210 exerted by a mold clamping unit (not shown), being released from the preform 10 retained in the neck mold 20. The first and second cavity molds 30, 40 are downwardly moved below the bottom of the preform 10 by a vertical downward opening force 200 exerted by the mold clamping unit. Since the shoulder 14 of the preform 10 is in the shape of undercut, the mold halves 30a, 30b of the first cavity mold 30 are horizontally moved (i.e. right and left in the plane of FIG. 1) at an initial stage of the downward movement. This horizontal movement of the mold halves 30a, 30b are executed by the vertical downward opening force 200 received from the mold clamping unit. The core mold 18, and first and second cavity molds 30, 40 are clamped by a mold clamping force which is reverse to the foregoing mold opening forces 200, 210.

The mold halves of the first cavity mold 30 are horizontally opened as described hereinafter. The first cavity mold 30 has, at its lower outer wall, a first annular reverse taper 34 which is outwardly inclined to an upper end. The second cavity mold 40 has a recess surrounding the first annular taper 34. A second annular taper 44 is formed in the recess, having an angle substantially equal to the angle of the first annular taper 34. These annular tapers 34, 44 are in contact with each other when the molds are clamped. The tapers 34, 44 have an angle $\Theta_1$.

The third member 40c of the second cavity mold 40 has a guide shaft 46 which is inclined upwardly with an angle $\Theta_2$ smaller than the angle $\Theta_1$. Holders 30c, 30d of the first cavity mold 30 have an inclined guide hole 36 for receiving the inclined guide shaft 46 therein. A coil spring 50 is arranged in the guide hole 36. An upper end 50a of the coil spring 50 is held by the upper portion of the guide hole 36. The lower end 50b of the coil spring 50 is in contact with the upper surface of the second cavity mold 40. A transverse hole 38 is formed in an area of the first cavity 30 where there is no guide hole 36. The transverse hole 38 is in parallel to the direction for opening the first cavity mold 30 horizontally, receiving a stop rod 52 therein. The stop rod 52 have at its opposite ends a pair of stops 54, 54 to control a stroke for opening the mold halves of the first cavity mold 30.

Figure 3:
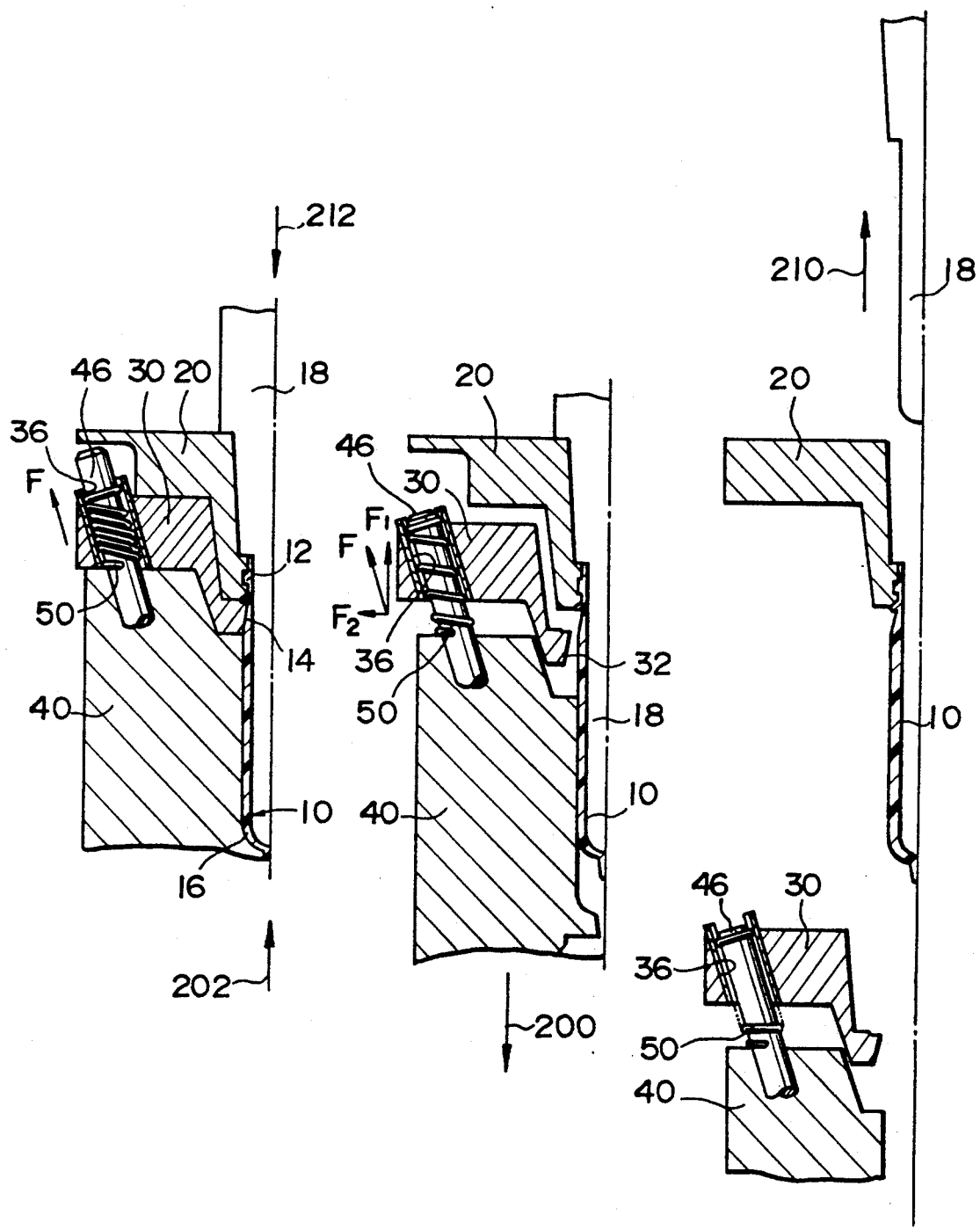
FIGS. 3(A) to 3(C) show an operation sequence of opening the molds in the system of FIG. 1.

The operation of the preform injection molding system will be now described referring to FIGS. 3(A) to 3(C).

FIG. 3(A) shows that the molds are clamped by the vertical clamping forces 202, 212 exerted by the mold clamping unit. Specifically, the core mold 18 is descended by the mold clamping force 212 of the clamping unit, while the first and second cavity molds 30, 40 are ascended to come into contact with the bottom of the neck mold 20 by the mold clamping force 202. The annular tapers 44 and 34 of the second and first cavity molds 40, 30 are contacted with each other to clamp firmly the mold halves 30a, 30b of the first cavity mold 30 radially and inwardly. In other words, these mold halves 30a, 30b are clamped by the vertical upward clamping force 202 applied to the second cavity mold 40. Under the clamped condition, a plastic molding compound is introduced via a gate 41 at the center of the second cavity mold 40 to make the preform 10. Thus the preform 10 including the neck 12, shoulder 14 having the undercut, and bottomed side wall 16 will be injection-molded.

The molds will be opened after the injection molding of the preform 10. The mold opening force 200 of the mold clamping unit moves the second cavity mold 40 downwardly. Since the first cavity mold 30 is always biased by the coil spring 50 to move above the second cavity mold 40, the first cavity mold 30 is not moved vertically at the initial stage.

The moving bias force F of the coil spring 50 is obliquely applied along the inclined guide hole 36 and the inclined guide shaft 46. The moving bias force F of the coil spring 50 produces a vertical moving bias force $F_1$ and a horizontal moving bias force $F_2$ as components of force. The vertical moving bias force $F_1$ functions to prevent vertical movement of the first cavity mold 30. On the other hand, since the second cavity mold 40 is downwardly moved, the horizontal moving bias force $F_2$ is applied to the first cavity mold 30 so that a force is applied to the first cavity mold 30 to move its mold halves to right and left as shown in FIG. 3(B). Under this condition, the first and second cavity molds 30, 40 are engaged with each other by the inclined guide hole 36 and the inclined guide shaft 46, so that the mold halves 30a, 30b of the first cavity mold 30 are guided by the angle of inclination $\Theta_2$.

Following the downward movement of the second cavity mold 40, the mold halves 30a, 30b are horizontally opened. The first and second annular tapers 34, 44 are initially in contact with each other, being protected against an excessive frictional contact with each other since the taper angle $\Theta_1$ is larger than the angle of inclination $\Theta_2$. The first cavity mold 30 are horizontally opened until its mold halves 30a, 30b come into contact with the stops 54, 54 at the opposite ends of the stop rod 52.

When the first cavity mold 30 has been horizontally opened, the cavity side 32 of the first cavity 30 is completely released from the largest diameter portion of the shoulder 14 including the undercut of the preform 10.

Thereafter the second cavity mold 40 is continuously descended. Since the horizontal opening of the first cavity mold 30 is prevented by the stops 54, 54, both the first and second cavities 30, 40 are coupled by the coil spring 50 to be descended together as shown in FIG. 3(B).

FIG. 3(C) shows that the molds have been opened. Specifically, the core mold 18 is lifted by the opening force 210 to the position where the core mold 18 is completely released from the neck mold 20 holding the preform 10. The first and second cavity molds 30, 40 are descended further below the bottom of the preform 10. Then, both the first and second cavity molds 30, 40 can be opened to a position where they do not interfere with the preform 10 which is held by the neck mold 20 to be conveyed to a next step, temperature controlling step, for example.

With the foregoing arrangement, the first cavity mold 30, which has the cavity side for forming the undercut for the preform 10, can be horizontally opened by the mold clamping unit issuing only the vertical opening forces 200, 210. The injection molding system of this embodiment can be simple, compact and energy-efficient compared with a system including a mold clamping unit for issuing a horizontal opening force. The first cavity mold which is relatively light in weight can be horizontally and smoothly opened with ease by applying the vertical opening force 200.

Second Embodiment

An injection molding system of a second embodiment uses an air cylinder 60 in place of the coil spring 50 to guide the first cavity mold 30. The members identical to those of the first embodiment will be assigned with same reference numerals and will not be described in detail.

Figure 4:
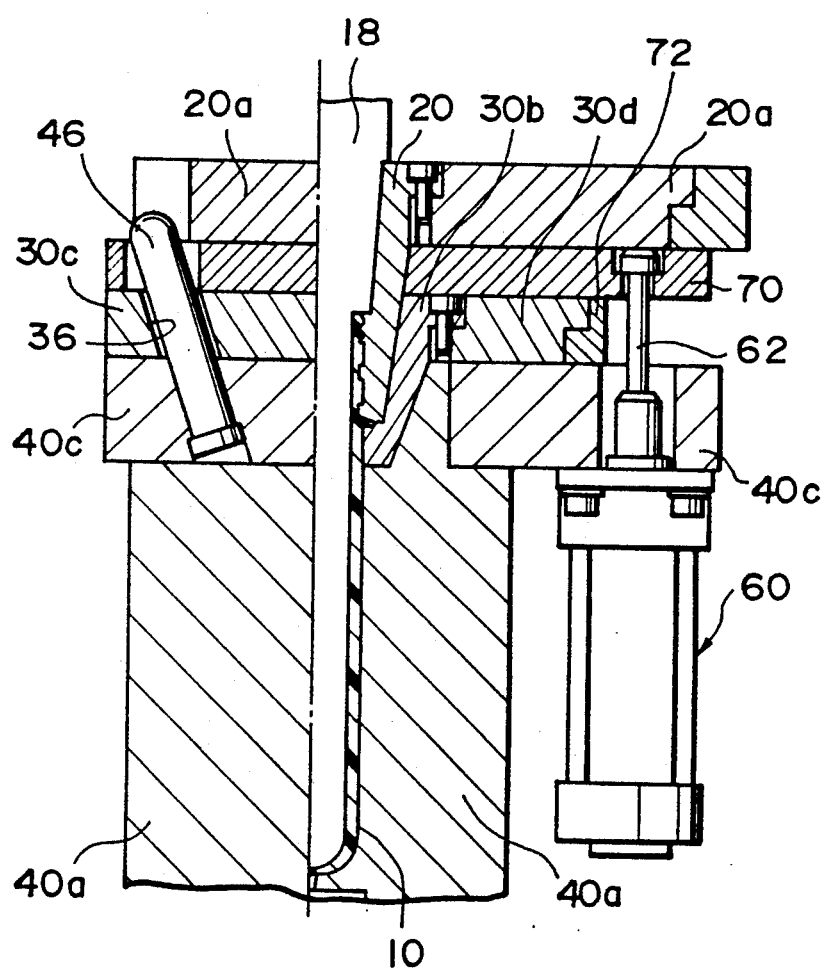
FIG. 4 is a cross-sectional view of a preform injection molding system according to a second embodiment.

In FIG. 4, the right side shows a front elevational view and the left side is a cross-sectional view of the guide shaft 46.

Figure 5:
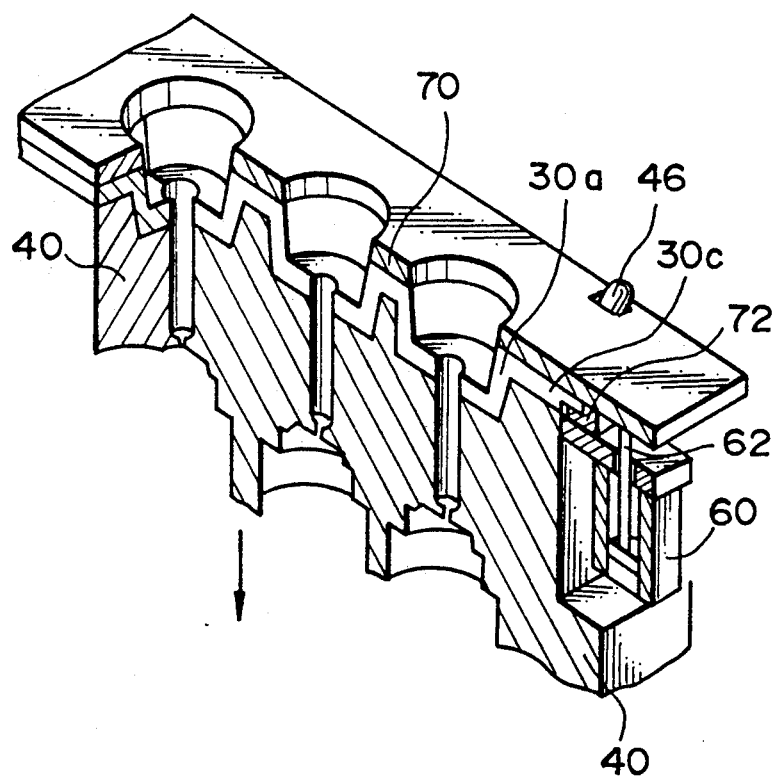
FIG. 5 is a schematic perspective and cross-sectional view of a multi-cavity mold to which the system of the second embodiment is applied.

The following members are different from the members used for the injection molding system of the first embodiment. The inclined guide hole 36 of the first cavity mold 30 receives the inclined guide shaft 46 with a smaller fit tolerance, since no coil spring is fitted in the guide hole 36. A retainer plate 70 is located between the plate 20a of the neck mold 20 and holders 30c, 30d of the first cavity mold 30. The retainer plate 70 has a guide rail 72 for guiding the mold halves 30a, 30b of the first cavity mold 30 horizontally (i.e. in the direction perpendicular to the plane of the drawing sheet of FIG. 4). An air cylinder 60 is positioned on the side of the second cavity mold 40, having a cylinder rod 62 moving upwardly and downwardly. The upper end of the cylinder rod 62 is fastened to the retainer plate 70. When preforms 10 are made by using a multi-cavity mold, a plurality of the first and second cavity molds 30, 40 are arranged as shown in FIG. 5, the retainer plate 70 becomes long according to the arrangement of these molds, being vertically movable by one air cylinder 60.

The operation of the injection molding system will now be described referring to FIGS. 6(A) to 6(D).

Figures 6A, 6B:
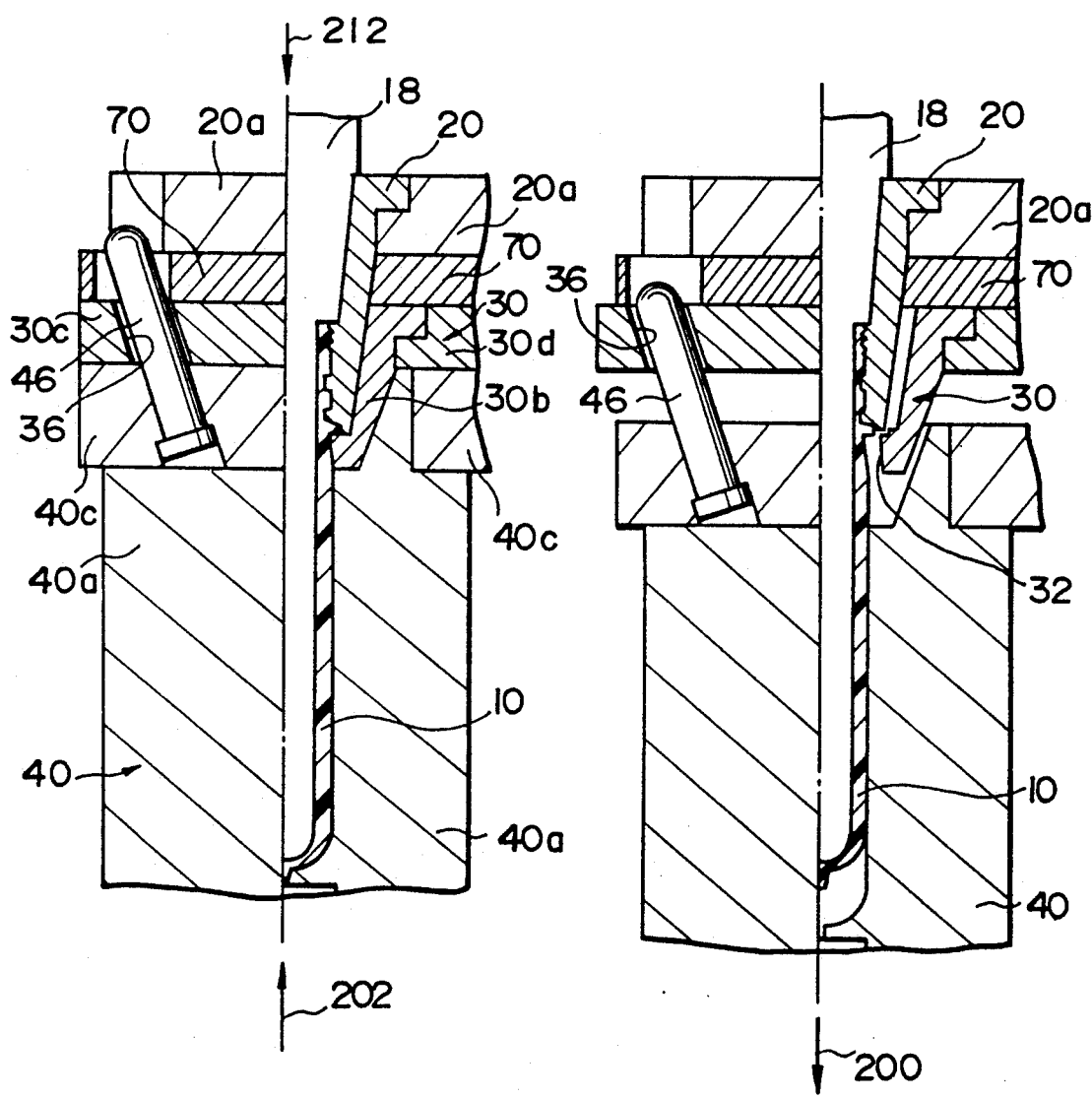

FIG. 6(A) shows that the molds are clamped to injection-mold the preform 10. The retainer plate 70, and first and second cavity molds 30, 40 are clamped by the vertical upward clamping force 202.

After injection-molding the preform 10, the mold opening force 200 begins to move the second cavity mold 40 downwardly. At first, only the second cavity mold 40 is moved downwardly by the vertical mold opening force 200 exerted by the clamping unit. Therefore, the cylinder rod 62 of the air cylinder 60 is upwardly projected, keeping the retainer plate 70 in close contact with the bottom of the neck mold 20. The height of the first cavity mold 30 remains the same. When the second cavity mold 40 begins moving downwardly, the inclined guide shaft 46 moves in the inclined guide hole 36 of the first cavity mold 30. Thereafter, the guide shaft 46 engaged in the guide hole 36 guides the mold halves 30a, 30b of the first cavity mold 30 to be opened right and left in the plane of the drawing sheet of FIG. 6(B). When the cavity side 32 of the first cavity mold 30 is completely released from the largest diameter portion of the shoulder 14 having the undercut of the preform 10, the cylinder rod 62 of the air cylinder 60 stops its movement.

Then downward movement of the second cavity mold 40 is started. The second cavity mold 40 and retainer plate 70 which are coupled by the cylinder rod 62, and first cavity mold 30 supported by the retainer plate 70 are downwardly moved together.

The second cavity mold 40 is downwardly moved to a lower position shown in FIG. 6(C). At this position, the retainer plate 70 and the first cavity mold 30 are above the bottom of the preform 10. Under this condition, the cylinder rod 62 of the air cylinder 60 is pulled by a pulling force 220. As shown in FIG. 6(D), the retainer plate 70 and first cavity mold 30 are downwardly moved. When the bottom of the first cavity mold 30 contacts with the top of the second cavity mold 40, the top of the retainer plate 70 is below the bottom of the preform 10. Then the core mold 18 is lifted to come out of the preform 10. The preform 10 will be rotatably transferred to a next step by using the neck mold 20.

In the second embodiment, after the downward movement of the second cavity mold 40, the retainer plate 70 and the first cavity mold 30 are also moved downwardly by the air cylinder 60. The stroke for opening the second cavity mold 40 can be shortened compared to the stroke of the molding system of the first embodiment, thereby making the molding system more compact. The air cylinder 60 may have a relatively low power since it is not used for clamping the molds.

Third Embodiment

Figure 7:
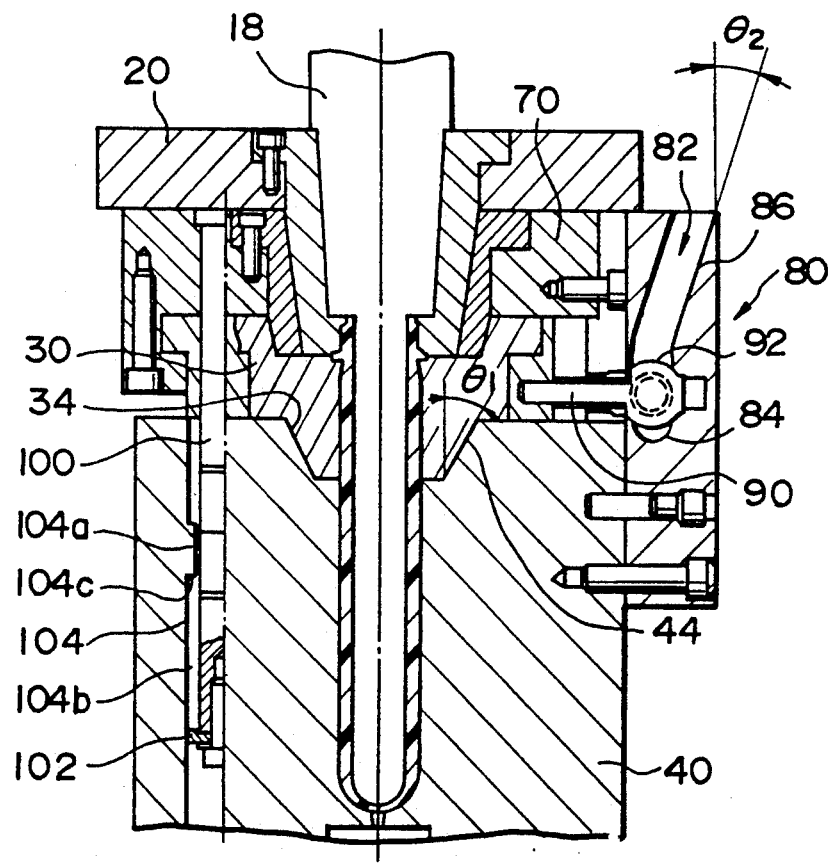
FIG. 7 is a cross-sectional view of an injection molding system according to a third embodiment.

FIG. 7 shows a preform injection molding system according to a third embodiment of this invention. This system uses a cam mechanism in place of the inclined cav-guide holes 36 and inclined guide shafts 46 of the systems in the first and second embodiments.

The third embodiment differs from the first and second embodiments in the following. A cam block 80 is mounted on a side of the second cavity mold 40. The cam block 80 includes a grooved cam 82, which has a vertical groove 84 at a lower portion thereof and an portion 86 extending from the vertical portion and is inclined outwardly. A shaft 90 projects from a side of the first cavity mold 30. The shaft 90 has a cam follower 92 which is engaged with the grooved cam 82. When the inclined portion 86 has an angle of inclination $\Theta_2$, this angle of inclination $\Theta_2$ is preferably smaller than the angle of inclination $\Theta_1$ of the tapers 34, 44 (i.e. $\Theta_1 > \Theta_2$).

The first cavity mold 30 includes a stop rod 100 extending downwardly therefrom. The stop rod 100 has a stop 102 at its one end. The second cavity mold 40 has a pit 104 into which the stop rod 100 is inserted. The pit 104 has an upper small diameter portion 104a, a lower large diameter portion 104b, and a step 104c located between the small and large diameter portions 104a, 104b.

The following describe the operation of this system.

Figure 8:
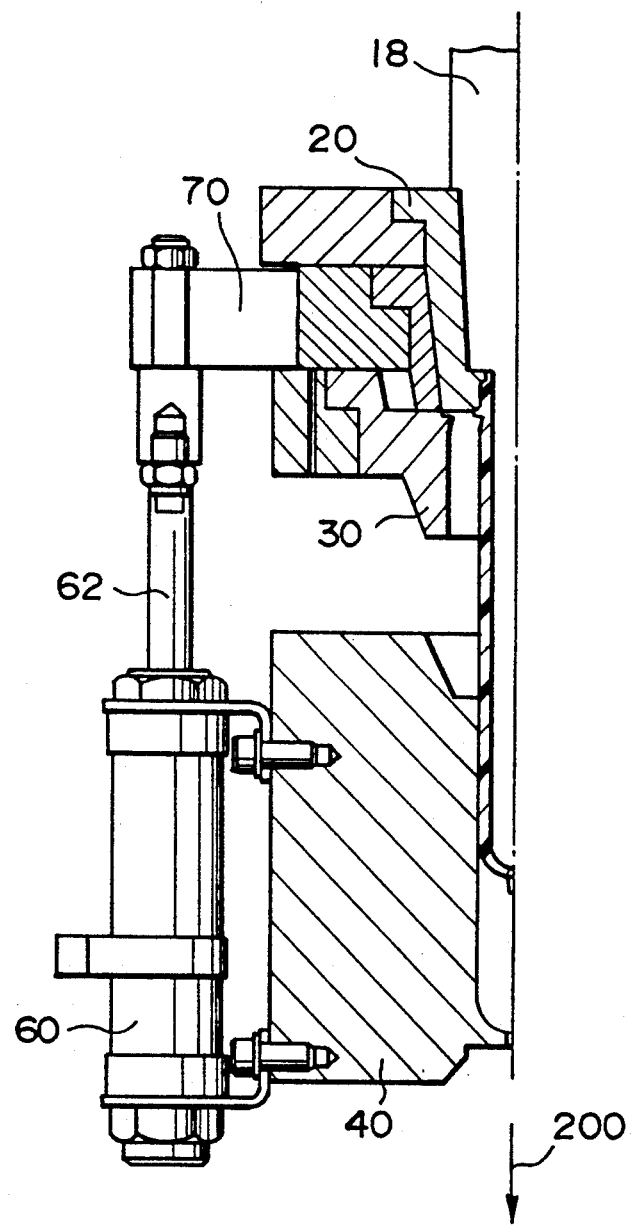
FIG. 8 is a schematic cross-sectional view of a mechanism for moving a first cavity mold of the system of FIG. 7.

When the second cavity mold 40 is downwardly moved by a mold opening force 200 after injection-molding the preform 10, the cylinder rod 62 of the air cylinder 60 extends upwardly as shown in FIG. 8 as done in the system of the second embodiment, keeping the retainer plate 70 as high as the neck mold 20 to be in contact with the neck mold 20. As the second cavity mold 40 is downwardly moved, the cam follower 92 follows the grooved cam 82 of the second cavity mold 40. When it reaches the inclined portion 86 of the grooved cam 82, the cam follower 92 is outwardly guided to horizontally open the mold halves 30a, 30b of the first cavity mold 30. The succeeding downward movement of the first and second cavity molds 30, 40 can be carried out by stopping the cylinder rod 62 of the air cylinder 60.

To assure reliable mechanical engagement of these molds 30, 40, the stop 102 at the end of the stop rod 100 is contacted with the step 104c of the second cavity mold 40. In this embodiment, the mold opening stroke can be shortened as shown in FIG. 6(D), since the retainer plate 70 and the first cavity mold 30 can be downwardly moved by the air cylinder 60 after the second cavity mold 40 stops its downward movement.

As shown in FIG. 7, the retainer plate 70 extends to a position where it covers the lower outer wall of the neck mold 20, contrary to the retainer plate 70 of the second embodiment. The retainer plate 70 also functions to cool the neck 12 of the preform 10.

Fourth Embodiment

Figure 9A:
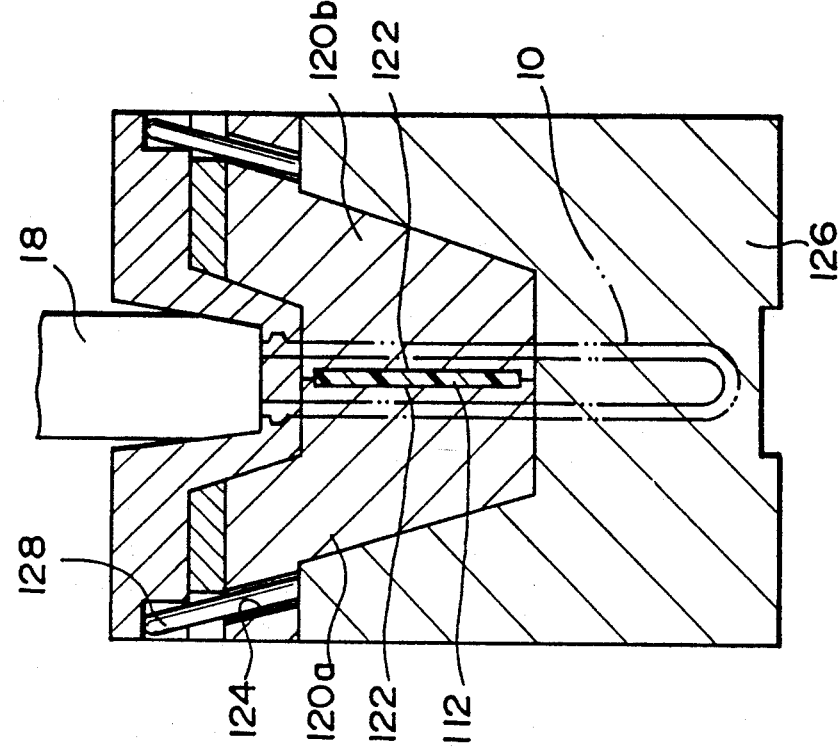
FIGS. 9(A) and 9(B) are front and side cross-sectional views, respectively, of an injection molding system for making a preform having a handle according to a fourth embodiment.
Figure 9B:
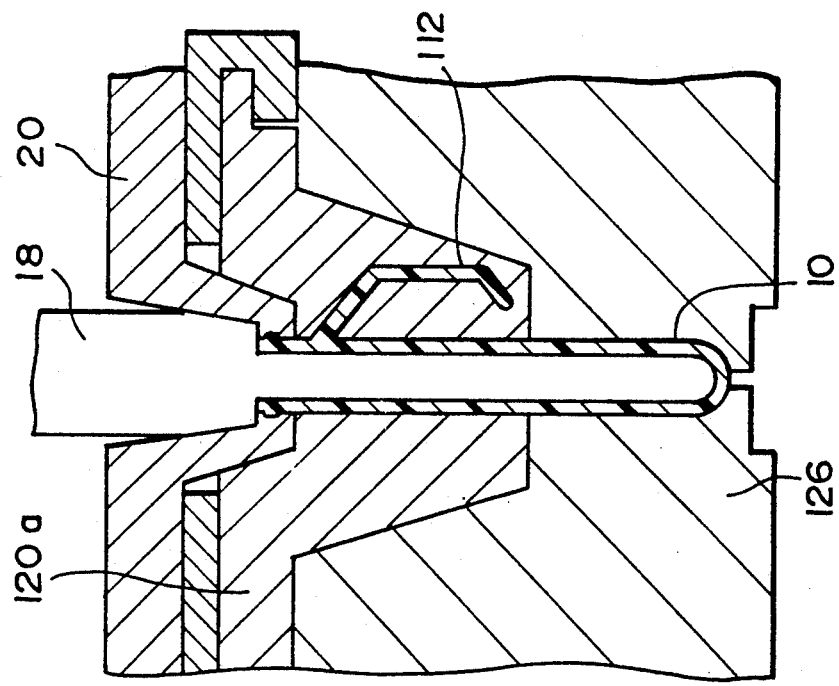

In a fourth embodiment, this invention is applied to a system for injection-molding a preform 10 having a handle 112 as shown in FIGS. 9(A) and (B). The handle 112 is in the shape of undercut. In this embodiment, the first cavity mold 120 is made high enough to form the handle 112. A handle cavity 122 is formed on parting sides of the mold halves 120a, 120b of the first cavity mold 120.

Figure 10:
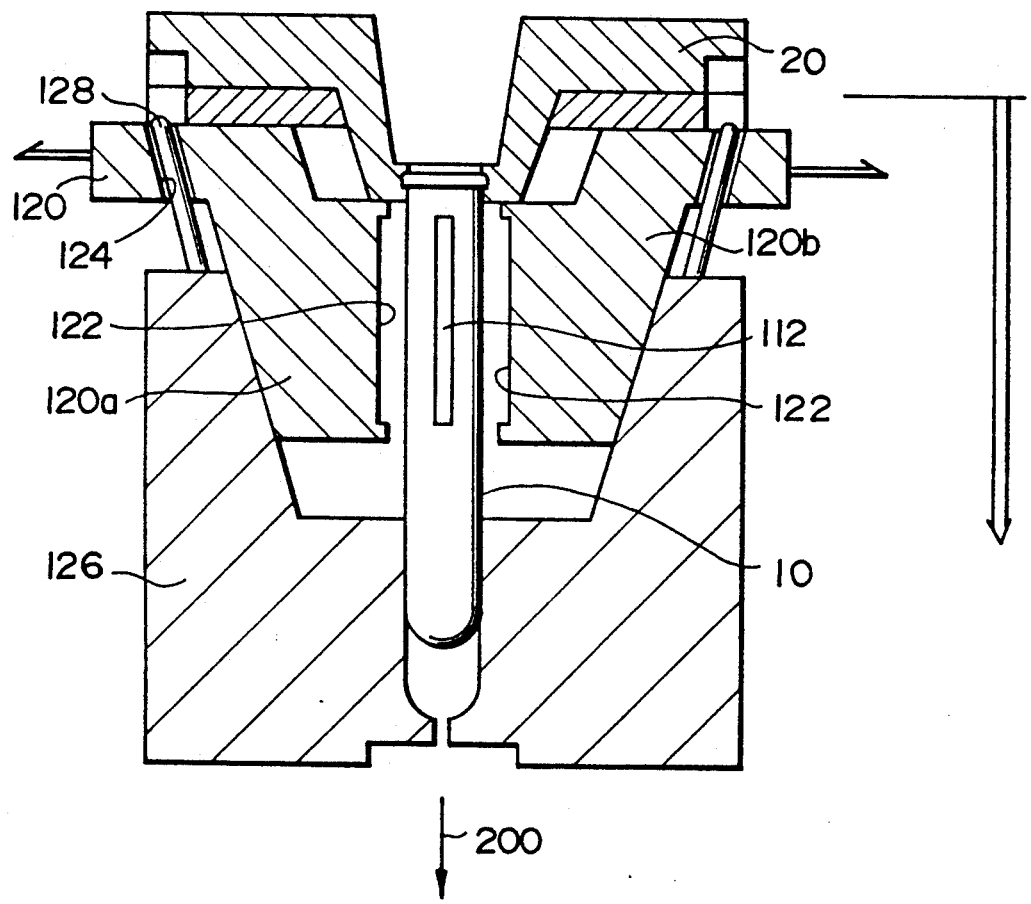
FIG. 10 shows an operation sequence of opening molds in the molding system of FIG. 9.

The first cavity mold 120 is opened by engaging the inclined guide hole 124 of the first cavity mold 120 and the inclined guide shaft 128 of the second cavity mold 126 (see FIG. 10). At the initial stage of the downward movement of the second cavity mold 126, the first cavity mold 120 can be horizontally opened as described with reference to the first or second embodiment.

This invention is not only applicable to the foregoing embodiments but also can be modified as desired within the scope of the subject matter.

It is acceptable that the second cavity mold may be moved upwardly and downwardly in relation to the preform. This invention is also applicable to a system in which the neck mold for holding the preform is vertically moved to be opened and clamped. It is needless to say that this invention is applicable to a molding system without using the neck mold.

What is claimed is:

1. An injection molding system for making a preform with an undercut on an outer wall thereof, comprising:
(a) a neck mold for defining an outer wall of a neck of the preform and for transferring the injection molded preform to a succeeding process after mold opening by holding a neck portion of the preform
(b) an injection core mold for defining an inner wall of the preform and to be moved axially of and relatively to the preform;
(c) an injection cavity mold for defining an outer wall, except said neck portion, of the preform and to be moved axially of and relatively to the preform, said injection cavity mold including a first cavity mold having mold halves to be opened and clamped in the direction perpendicular to the axial direction of the preform, the cavities of said mold halves defining an outer wall of the preform having the undercut, and a second cavity mold having a cavity for defining another outer wall of the preform and to be opened axially of and relatively to the preform, said first cavity mold including a first annular taper at the lower end thereof, said second cavity mold including a recess surrounding said annular taper of said first cavity mold and having a second annular taper therein so that aid first and second annular tapers come into contact with each other when said molds are clamped;
(d) a mold clamping unit for opening and clamping said injection core mold and said injection cavity mold by using a mold clamping force along the axial direction of the preform and an opening force reverse to the clamping force; and
(e) a mold half opening mechanism for receiving the mold opening force from sad second cavity mold to guide said mold halves to a position where said first cavity mold is released in directions perpendicular to the axial direction of the preform from a largest diameter portion of the undercut of the preform as said second cavity mold is relatively opened in the axial direction of the preform at the initial stage of the mold opening process, and then to guide both said first and second cavity molds in the axial direction of the preform to open said first and second cavity molds.

2. An injection molding system according to claim 1, wherein said mold halves have a through hole extending in the mold opening direction, a shaft extending from said mold halves and inserted in said through hole, and flange-shaped stops at opposite ends of said shaft.

3. An injection molding system according to claim 1, wherein said mold half opening mechanism includes a cavity mold returning unit for moving said first cavity mold in the axial direction of the preform to contact said first cavity mold with said second cavity mold after opening said second cavity mold.

4. An injection molding system according to claim 1, wherein the undercut of the preform is reversely tapered at the shoulder of the preform.

5. An injection molding system according to claim 1, wherein the undercut of the preform is a handle projecting from a side wall of the preform below the neck of the preform.

6. An injection molding system according to claim 1, wherein said mold half opening mechanism includes a guide shaft mounted on said second cavity mold and inclined in the axial direction of the preform, and an inclined guide hole mounted on said first cavity mold and receiving said guide shaft therein.

7. An injection molding system according to claim 6, wherein said first cavity mold includes a first annular taper at the lower end thereof, said second cavity mold includes a recess surrounding said annular taper of said first cavity mold and having a second annular taper therein so that said first and second annular tapers are in contact with each other when said molds are clamped.

8. An injection molding system according to claim 7, wherein an angle of inclination $\Theta_1$ of said first and second annular tapers in the axial direction of the preform is larger than an angle of inclination $\Theta_2$ of said inclined guide hole and said inclined guide shaft.

9. An injection molding system according to claim 6, wherein said mold half opening mechanism includes a spring for always biasing said first cavity mold to move away from said second cavity mold in the axial direction of the preform.

10. An injection molding system according to claim 6, further including a retainer plate for opening and clamping said mold halves of said first cavity mold.

11. An injection molding system according to claim 10, wherein said mold half opening mechanism includes a moving unit for varying a distance between said retainer plate and said second cavity mold, said moving unit increasing the distance between said retainer plate and said second cavity mold while controlling the movement of said first cavity mold in the axial direction of the preform in the initial stage of the mold opening stage, keeping the distance constant after said mold halves have been opened, guiding both said first and second cavity molds to open these molds axially, and decreasing the distance to contact said first cavity mold with said second cavity mold after said second cavity mold is opened.

12. An injection molding system according to claim 1, wherein said first cavity mold includes a first annular taper at the lower end thereof, said second cavity mold includes a recess surrounding said first annular taper and having a second annular taper therein, and both said first and second annular tapers come into in contact with each other when said molds are clamped.

13. An injection molding system according to claim 12, wherein an angle of inclination $\Theta_1$ of said first and second annular tapers in the axial direction of the preform is larger than an angle of inclination $\Theta_2$ of said inclined guide hole and said inclined guide shaft.

14. An injection molding system according to claim 1, wherein said mold half opening mechanism includes a cam mounted on said second cavity mold and having a guide surface inclined in the direction to open said mold halves and a cam follower mounted on said first cavity mold to follow said cam.

15. An injection molding system according to claim 14, wherein said mold half opening mechanism includes a spring for always biasing said first cavity mold to move away from said second cavity mold in the axial direction of the preform.

16. An injection molding system according to claim 14 further including a retainer plate for opening and clamping said mold halves of said first cavity mold.

17. An injection molding system according to claim 16, wherein said mold half opening mechanism includes a moving unit for varying a distance between said retainer plate and said second cavity mold, said moving unit increasing the distance between said retainer plate and said second cavity mold while controlling the movement of said first cavity mold in the axial direction of the preform in the initial stage of the mold opening stage, keeping the distance constant after said mold halves have been opened, guiding both said first and second cavity molds to open these molds axially, and decreasing the distance after said second cavity mold to contact said first cavity mold with said second cavity mold after said second cavity mold is opened.

* * * * *